Nov. 19, 1940.　　　　C. E. HAGEL　　　　2,222,029
SAFETY CUT-OUT SWITCH
Filed Feb. 10, 1939
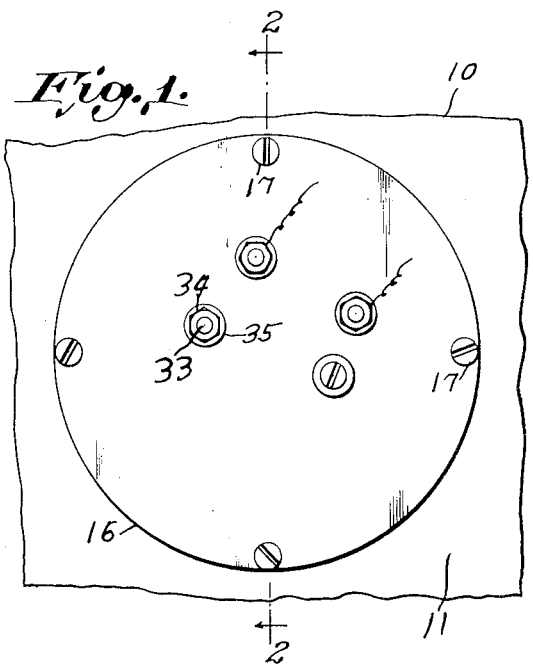
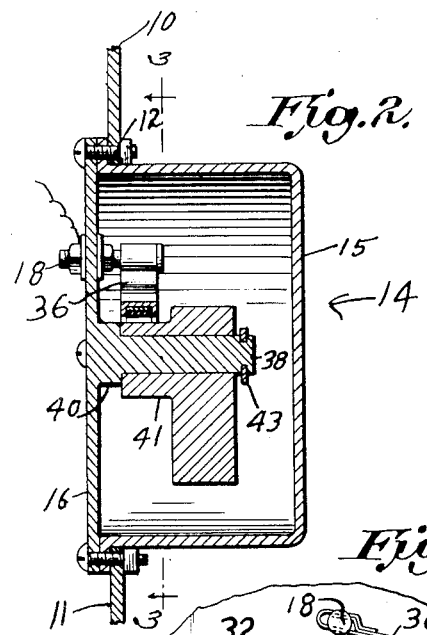
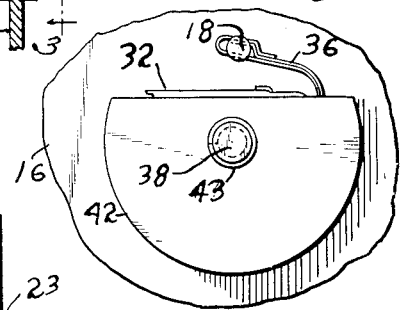
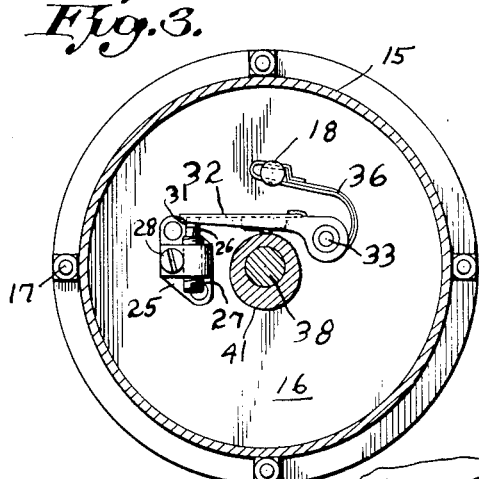
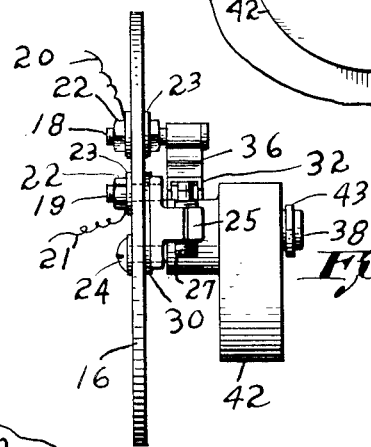
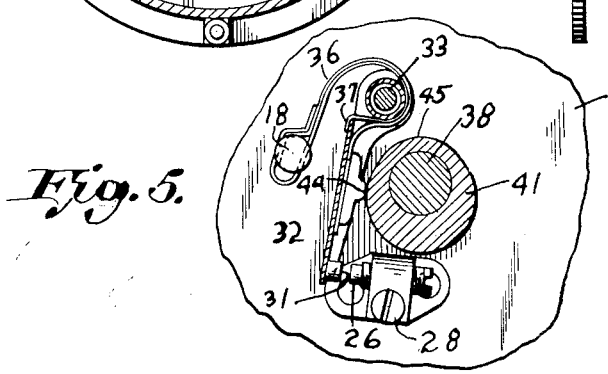
Inventor.
Charles E. Hagel
by Miller + Miller
Attys.

Patented Nov. 19, 1940

2,222,029

UNITED STATES PATENT OFFICE 2,222,029

SAFETY CUT-OUT SWITCH

Charles E. Hagel, Pine Ridge, S. Dak.

Application February 10, 1939, Serial No. 255,769

1 Claim. (Cl. 200—52)

This invention relates to a safety cut-out switch and has for an object to provide an improved safety cut-out switch especially intended for cutting off the ignition of an automobile or other vehicle should the same over-turn and thus prevent a short circuit and possible fire.

The further object of this invention is to provide an improved safety cut-out switch which will operate positively to cut off the ignition should the vehicle over-turn irrespective of how long a period of time has elapsed before the switch is operated.

The further object of this invention is to provide a safety cut-out switch having non-oxidizable contact points making it impossible for the switch to interfere with the ignition of the vehicle except when the vehicle should over-turn, and which will not be accidentally operated thru the vehicle accelerating or decelerating rapidly.

With the foregoing and other objects in view, this invention comprises the combinations, of constructions and arrangements of parts hereinafter claimed, set forth and disclosed in the accompanying drawing:

Figure 1 is an elevational view of the engine side of the safety cut-out switch of this invention as applied to the dashboard of the vehicle.

Figure 2 is a sectional view of Figure 1 on line 2—2.

Figure 3 is a sectional view on line 3—3 of Figure 2.

Figure 4 is an end elevational view of the mechanism.

Figure 5 is a sectional view thru the cam and

Figure 6 is a plan view of the operating weight.

There is shown at 10 the dashboard of an automobile or other vehicle in which the side 11 faces toward the engine of the vehicle. This dashboard 10 has a circular opening cut there thru as at 12 so as to receive and support the cut-out safety switch 14 of the invention.

This cut-out switch 14 includes a housing 15 and a switch wall 16, secured together by bolts and nuts 17 which likewise serve to secure the switch 14 to the dash 10.

Secured through the switch wall 16 is a pair of conductor bolts 18 and 19. The ignition wire between the engine coil and the engine distributor is broken into two sections 20 and 21, one section 20 being secured to the conductor bolt 18 and the other section 19 of the section 21 being secured through the conductor bolt 19. The conductor portions 20 and 21 are held in position by nuts 22.

Inasmuch as the conductor switch wall 16 may be of metal, the conductor bolts 18 and 19 are insulated from the conductor wall 16 by insulation washers and sleeves such as 23. Secured to the switch wall 16 by one of the conductor bolts 19 and a screw 24 is a bracket 25 thru which is passed a contact point 26 on the end of a threaded stud 27 held in adjustment by means of the lock screw 28.

The bracket 25 and securing screw 24 likewise are insulated from the switch wall 16 as at 30. The contact point 26 is preferably of platinum or other similar non-oxidizable metal and is substantially similar in construction to the contact points in the distributor. Another contact point 31 of similar metal is carried on the end of an arm 32 journaled about a shaft 33 which is secured through the switch wall 16 by a nut 34 and insulation 35. A bent over leaf spring 36 is anchored at one end to the conductor bolt 18 and at its other end 37, urges and presses the arm 32 so as to hold the contact 31 pressed tight against the contact 26, thereby insuring a continuous conducting path from the wire 20 to the wire 21, so long as the vehicle remains in an upright position. Should the vehicle over-turn, means are provided for immediately and automatically separating the contact 31 from the contact 26 so as to break the circuit from the wire 20 to the wire 21 and thus cut off the ignition to the engine.

This means consists of the journal 38 extending from a boss 40 on the switch wall 16. Pivoted on the journal 38 is a combined cam 41 and segmental weight 42, this cam and weight 32 being held on the journal 38 by a split ring 43 countersunk into an annulus near the end of the journal 38, though any other suitable fastening may be provided to hold the said end cam properly against the portion 40. The contact arm 32 carries an insulated button 44 in such a position that it is just above the low point 45 of the cam 41 when the switch is properly mounted in the vehicle dashboard 10 and the vehicle is in an upright position as shown in Figures 1 and 3. In such a position the spring 36 keeps the contact 31 tightly pressed against contact 26 to complete the circuit.

Should an accident occur and the vehicle turn on its side or top the segmental weight 42 will rotate about the journal 38 bringing the high point of the cam 41 into contact with the insulating button 44 causing the arm 32 to move about its pivot 33 and separate the contact 31 from the contact 26 immediately and automatically interrupting the circuit to the ignition and eliminating the possibility of a short-circuit causing a fire.

The switch 14 is mounted in the vehicle preferably on the dashboard 10 because of the fact that the dashboard 10 extends transversely of the vehicle and as thus mounted the acceleration or deceleration of the vehicle will have no tendency whatsoever to cause the weight 42 to rotate and operate the cam against the arm button 44.

The circuit is always complete through contacts 26 and 31 so long as the vehicle is not overturned, and due to the provision of these contact points 26 and 31 being non-oxidizable and preferably in the form of distributor points there will never be any interference with the normal operation of the ignition except when the vehicle is over-turned.

The circuit is normally complete and can be interrupted only by the weight 42 being rotated around the journal 38 which can happen only when the vehicle is over-turned. There is thus provided a safety cut-out switch which may remain inactive and unused for years yet is ever ready to go into immediate action instantly should the vehicle be over-turned for any reason whatsoever.

The novel features and the operation of this device will be apparent from the foregoing description. While the device has been shown in detail, it is obvious that this invention is not to be considered limited to the exact form disclosed, and that changes may be made therein within the scope of what is claimed, without departing from the spirit of the invention.

Having thus set forth and described the invention, what is claimed is:

A safety cut-out switch for the ignition of the engine of a vehicle, said switch being mounted transversely of the vehicle, said switch comprising a housing, a vertical switch wall in said housing extending transversely of said vehicle, a pair of conductor members extending through said switch wall and adapted to have one portion of an ignition conductor connected to each member of the pair, said conductor members being insulated from each other, a contact point connected to one conductor member mounted on said wall, a second contact point, means connecting said second contact point to the second conductor member comprising a pivot arm on which said second contact point is carried, a spring leaf means urging said pivoted arm to press its contact point against said first contact point to complete the circuit through said conductor members, an insulating button mounted on said contact carrying arm, a journal extending from said wall at right angles thereto, a cam provided on said journal adjacent said arm insulating button normally out of contact therewith, said cam, being rotatable in a plane parallel to said wall, and, upon rotation, pressing against said arm insulating button to pivot said arm and contact carried thereby away from said wall mounted contact to break the circuit therethrough, and a segmental weight secured to said cam to rotate said cam when the vehicle may be over-turned but not affect said cam on acceleration or deceleration of said vehicle.

CHARLES E. HAGEL.